(12) United States Patent
Mano (10) Patent No.: US 9,300,848 B2
(45) Date of Patent: Mar. 29, 2016

(54) CAMERA MODULE

(71) Applicant: SMK Corporation, Tokyo (JP)

(72) Inventor: Nobuyuki Mano, Tokyo (JP)

(73) Assignee: SMK Corporation, Tokyo (JP)

( * ) Notice: Subject to any disclaimer, the term of this patent is extended or adjusted under 35 U.S.C. 154(b) by 0 days.

(21) Appl. No.: 14/465,846

(22) Filed: Aug. 25, 2014

(65) Prior Publication Data

US 2015/0281527 A1   Oct. 1, 2015

(30) Foreign Application Priority Data

Mar. 26, 2014   (JP) .................................. 2014-64771

(51) Int. Cl.
*H04N 5/225* (2006.01)
*G03B 17/08* (2006.01)

(52) U.S. Cl.
CPC .............. *H04N 5/2252* (2013.01); *G03B 17/08* (2013.01); *H04N 5/2254* (2013.01)

(58) Field of Classification Search
CPC ...... G03B 17/56; G08B 13/1963; B60R 1/00; A01B 69/001; G08G 1/04; H04N 5/2253
USPC .......... 396/227, 419, 427; 348/118, 120, 149, 348/374
See application file for complete search history.

(56) References Cited

U.S. PATENT DOCUMENTS

2006/0171704 A1* 8/2006 Bingle .................... B60R 11/04
396/419

FOREIGN PATENT DOCUMENTS

JP   2008-070791 A   3/2008

* cited by examiner

*Primary Examiner* — Rochelle-Ann J Blackman (57) ABSTRACT

A camera module with internal structural elements housed inside a housing space formed by joining two cases together achieves a sufficient joint strength between both cases even though the thickness of the case walls is reduced to make the outer shape smaller, as well as a size reduction of the camera module is enabled, when the two cases are joined together by ultrasonic welding. The joint surfaces where the two cases are joined together are inclined relative to a plane orthogonal to the optical axis direction of a lens unit housed inside the camera module. Thereby, the area of joint surfaces is increased as compared with the case where the joint surfaces are parallel to the plane orthogonal. Also, since interference between a horn for applying ultrasonic waves during ultrasonic welding and the external connection part is avoided, the camera module can be made smaller.

4 Claims, 8 Drawing Sheets

CAMERA MODULE

CROSS REFERENCE TO RELATED APPLICATION

The contents of the following Japanese patent application are incorporated herein by reference,
NO. 2014-64771 filed on Mar. 26, 2014.

FIELD

The present invention relates to a camera module, and more particularly to a camera module with internal structural elements housed inside a housing space formed by joining two cases together.

BACKGROUND

A so-called "rear view monitor system" has been widespread in recent years, whereby an image taken by imaging means mounted on the back or elsewhere of a car is displayed by displaying means in the car, with an aim to perceive the situation of blind areas from the driver's seat of the car. Moreover, an "around view monitor system" is also becoming popular, which can display a simulated image of the car viewed from directly above, by processing and combining images taken from a total of four imaging means respectively mounted on the back, front, left, and right sides of the car.

Figure 5A:
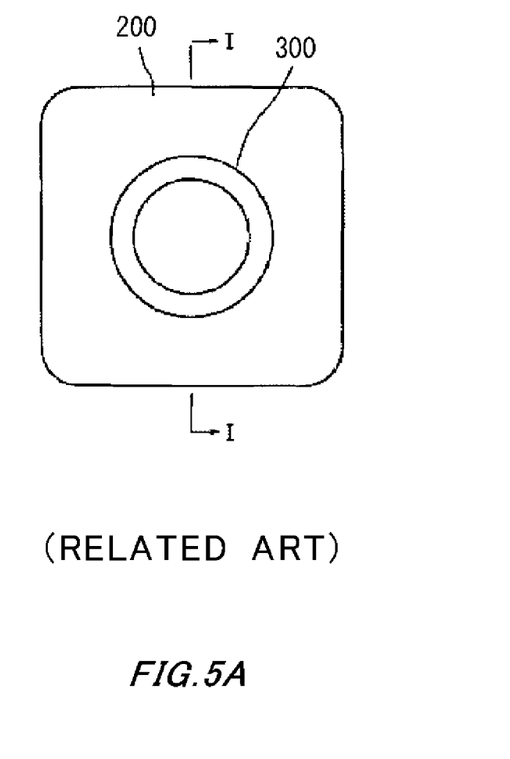
FIG. 5A and FIG. 5B include a front view and a cross-sectional view showing a related camera module.

Camera modules are widely used as the imaging means of such rear/around view monitor systems. Patent Literature 1 discloses one example of a camera module (see FIGS. 5A and 5B of the present application). The camera module disclosed in Patent Literature 1 is configured to have a lens unit 100 and an imaging element 400 inside a base part 200 that is formed hermetically by a front base part 200a and a rear base part 200b to take images by the lens exposed at an opening 300. The disclosure shows use of ultrasonic welding as one example of a method of firmly joining the front base part 200a and the rear base part 200b (paragraph 0037, Patent Literature 1).

Figure 5B:
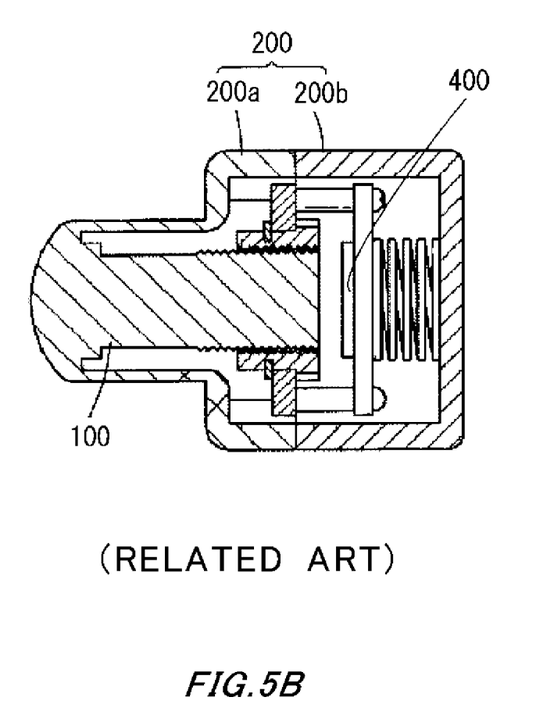

In the camera module disclosed in Patent Literature 1, joint surfaces between the front base part 200a and the rear base part 200b are parallel to a plane orthogonal to the optical axis direction of the lens unit 100 (left and right direction on the paper plane of FIG. 5B of the present application).

CITATION LIST

Patent Literature

Patent Literature 1: Japanese Patent Application Publication No. 2008-70791 (paragraph 0037, FIG. 1, and FIG. 2)

SUMMARY

Technical Problem

Design or appearance is one of the factors that have large impact on the commercial value of cars. While it is necessary to mount one to four camera module(s) on one car to construct a rear/around view monitor system as described above, today, the demand for camera modules that are smaller and inconspicuous as much as possible, so as not to compromise the aesthetic appearance of the car, is ever increasing.

To make the camera module smaller to respond to such demand, the side walls of the base part 200 need to be made thin as much as possible within the range in which performance requirements such as strength can be satisfied. However, reducing the thickness of the base part 200 will reduce the area of joint surfaces of the front base part 200a and rear base part 200b facing and joining to each other, so that a sufficient joint strength will be hard to achieve.

The present invention was made in view of such a problem, and it is an object of the present invention to provide a camera module that has a housing part formed by joining two cases together for housing internal structural elements, and is capable of achieving a sufficient joint strength between both cases even when the side walls of the cases are made thinner, thereby to attain both of a reduction in size and sufficient strength of the camera module.

Another object is to enable a reduction in size of the camera module even if external connection means such as a connector is provided such as to protrude from an area defined by a side wall of the case, in an application where the two cases are joined together by ultrasonic welding.

Solution to Problem

To solve the problems described above, a camera module according to the present invention includes a first case and a second case both made from a synthetic resin, the first case and the second case being joined together in a water tight manner to form a housing part, the housing part including a lens unit having an objective lens at its top, an imaging element, and a printed wiring board, which are accommodated therein. The first case has an upper face in which an opening is formed for exposing the objective lens. The joint surfaces of the first case and the second case where both are joined together are inclined relative to a plane orthogonal to an optical axis direction of the lens unit.

Provided that portions in respective walls of the first case and the second case to be joined together both have the same thickness, if a case where the joint surfaces between the first case and the second case are inclined relative to a plane orthogonal to an optical axis direction of the lens unit is compared with a case where they are parallel to the plane as in the conventional example, the area of the inclined joint surfaces can be larger than that of parallel surfaces, because of the longer entire circumferential length of inclined joint surfaces. With the use of a joining method whereby a uniform joint strength per unit area of the joined parts can be achieved, the joint strength will be higher if the area of the joint surfaces is larger.

In the camera module of the present invention, the joint surfaces between the first case and the second case may be joined together by ultrasonic welding.

Ultrasonic welding is preferable in carrying out the present invention because a uniform joint strength all around the joint surfaces, and favorable water tightness, can be achieved. With the use of ultrasonic welding, for example, the process of setting adhesive that would be necessary if joining is made by an adhesive, and the time required for carrying out that process, would be made unnecessary, so that the productivity of camera modules can be improved.

In the camera module according to the present invention, the first case or the second case may have an opening for external connection, and the camera module may further include external connection means that is held in a water tight manner relative to a peripheral part of the opening for external connection for connection with an external circuit.

With the external connection means, such as a connector, provided to either the first case or the second case, the camera module according to the present invention and an external circuit for receiving captured image data can be connected to each other with a wiring cable of a suitable length. This will enable the camera module to be mounted in any position, free of restrictions on the distance between the position where the external circuit is located and the mounting position of the camera module of the present invention. Since the external connection means is held in a water tight manner relative to the peripheral part of the opening for external connection, the water tightness of the camera module is intact.

In the camera module according to the present invention, the second case may have an opening for external connection, and the camera module may further include external connection means that is held in a water tight manner relative to a peripheral part of the opening for external connection, the external connection means for connection with an external circuit. The external connection means may be protruded from an area defined by an extension of a side wall of the first case.

Even though the external connection means is provided such as to protrude from an area defined by a side wall of the first case, interference between a horn for applying ultrasonic waves during ultrasonic welding and the external connection means is avoided due to the joint surfaces being inclined, so that the camera module can be made smaller.

According to the present invention, for the camera module that has a housing part formed by joining two cases together for housing internal structural elements, a sufficient joint strength between both cases is achieved even though the walls of the cases are made thinner, whereby a reduction in size and sufficient strength for the camera module are both achieved.

Also, the present invention enables a reduction in size of the camera module even if external connection means such as a connector is provided such as to protrude from an area defined by a side wall of the case, in an application where the two cases are joined together by ultrasonic welding.

DESCRIPTION OF EMBODIMENTS

A camera module 1 according to an embodiment of the present invention will be described with reference to FIG. 1 to FIG. 4B.

Figure 1:
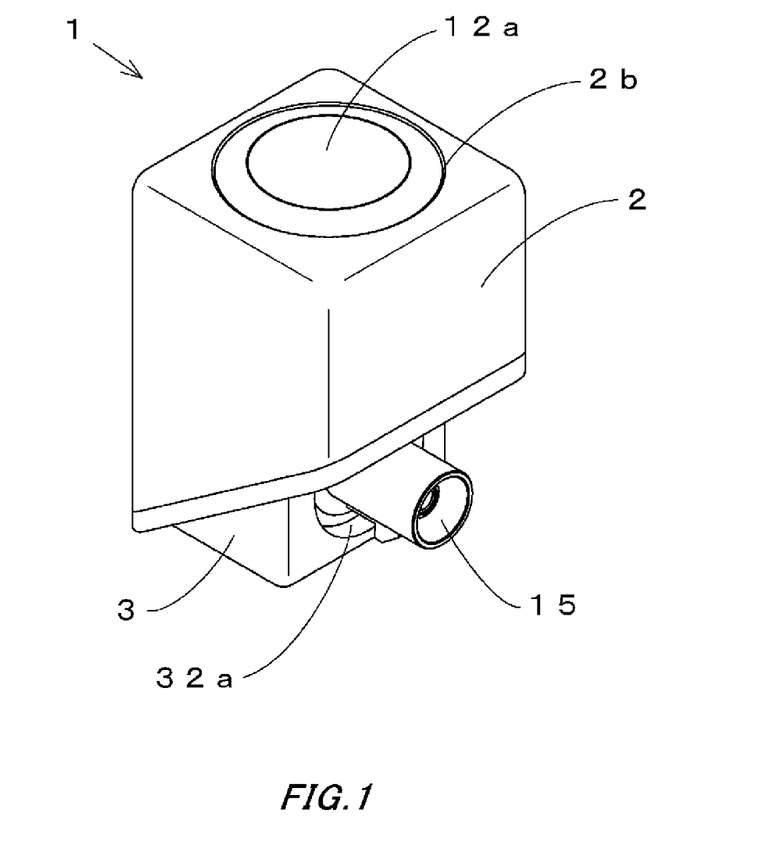
FIG. 1 is a perspective view showing the external appearance of a camera module according to the present invention.
Figure 2:
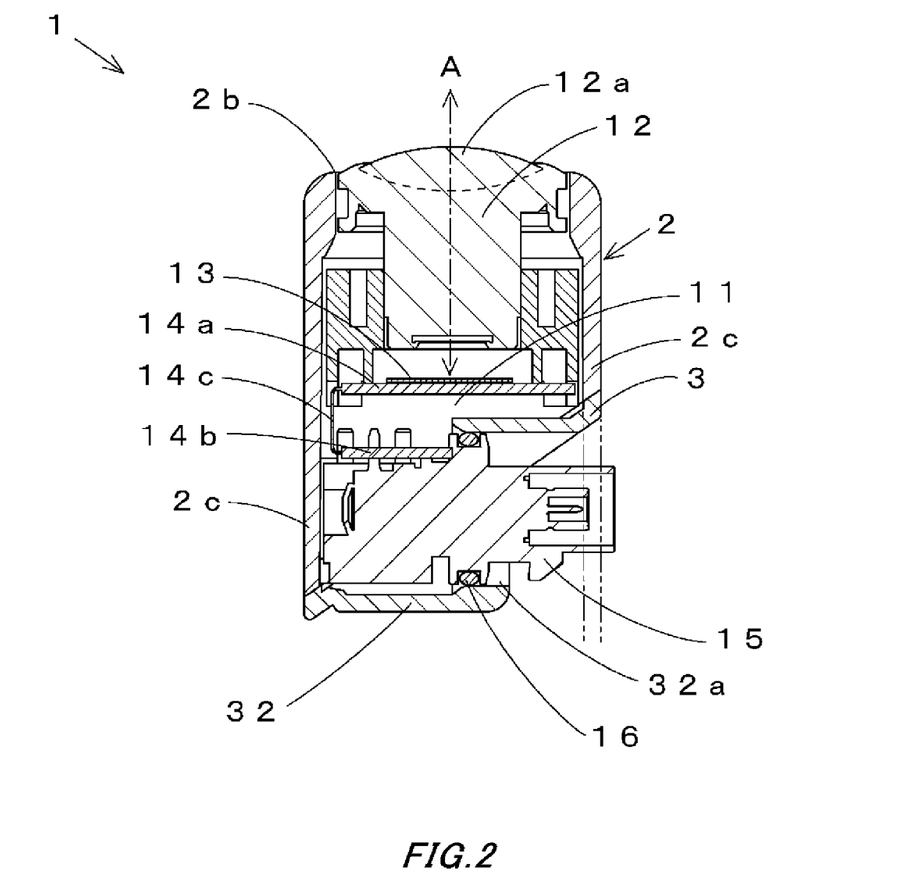
FIG. 2 is a longitudinal cross-sectional view of the camera module according to the present invention.
Figure 3A:
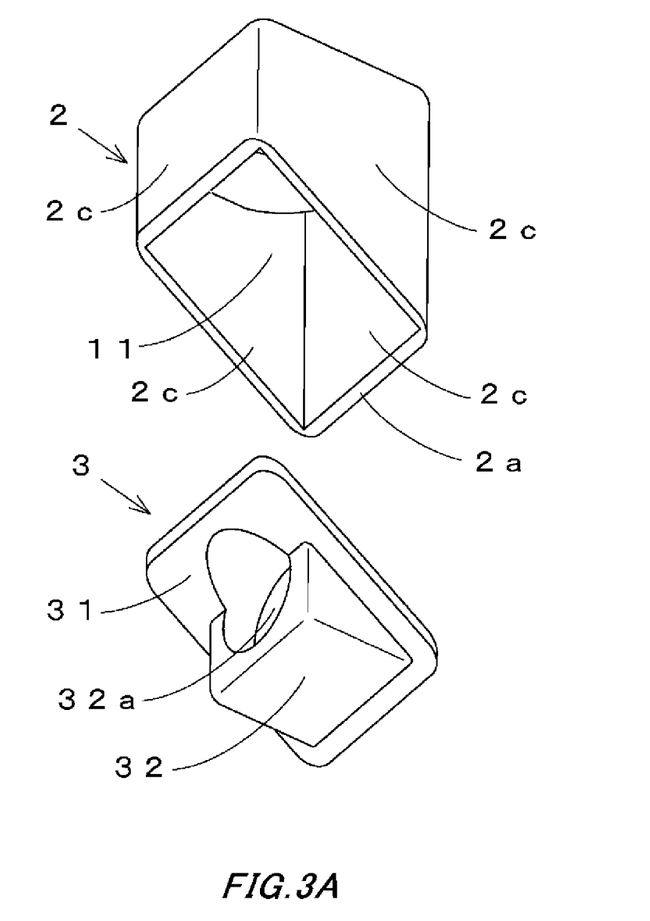
FIG. 3A and FIG. 3B are views of the external appearance of a first case and a second case of the camera module according to the present invention, showing a state before the cases are joined together.
Figure 3B:
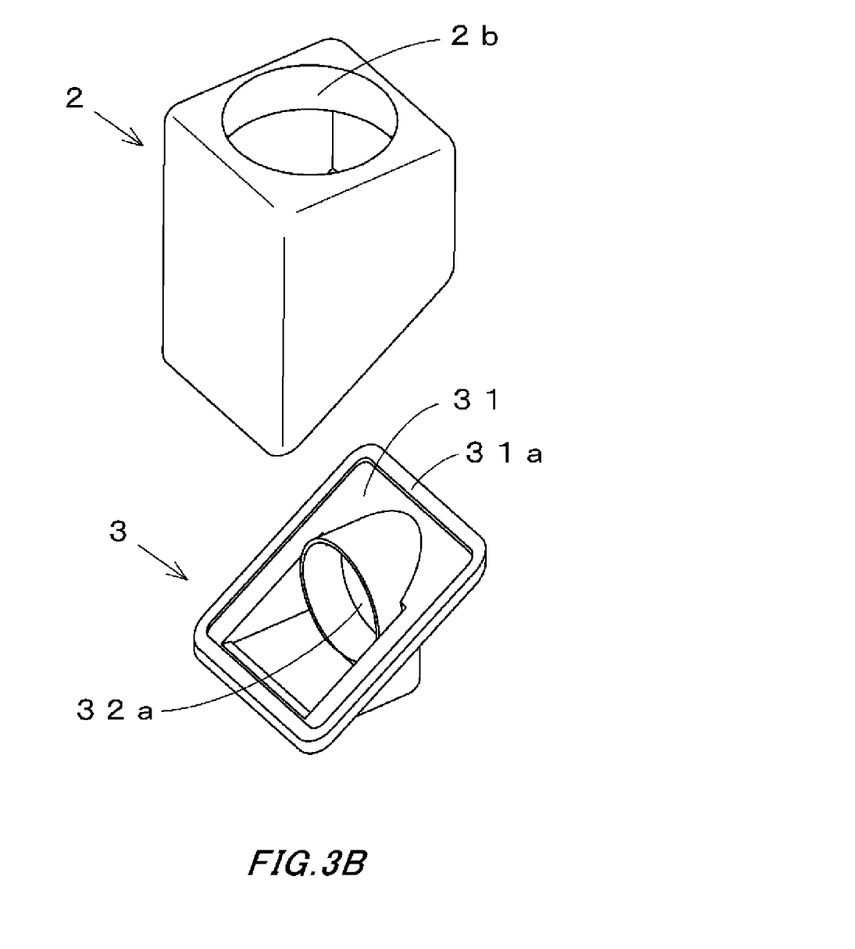

FIG. 1 is a perspective view showing the external appearance of the camera module 1 according to the embodiment of the present invention, FIG. 2 is a center longitudinal cross-sectional view of the camera module shown in FIG. 1, and FIGS. 3A and 3B are exploded views illustrating only a first case 2 and a second case 3.

The camera module 1 is used primarily for cars and mounted either on the back, or on the left or right side of the vehicle body of a car (not shown), and is used primarily for the purpose of perceiving the situation of blind areas from the driver's seat of the car. Note that an around view monitor system may also be constructed by mounting the camera module 1 on the back and left and right sides of the vehicle body, whereby a simulated image of the car viewed from directly above is displayed, by processing and combining the images obtained from each of the four camera modules 1.

The camera module 1 has a substantially rectangular parallelepiped, box-like shape having a housing part 11 inside, and is formed by joining together a first case 2 that constitutes an upper part of the camera module 1, and a second case 3 that constitutes a lower part. Inside the housing part 11 are accommodated and held a lens unit 12, an imaging element 13, a printed wiring board 14 and the like, to be described later.

The first case 2 is box-shaped, having an upper face, four side walls 2c, and a lower end that is open diagonally at an angle of about 45°, with a hollow inside that forms the housing part 11. A circular opening 2b is provided in the upper face of the first case 2, and a top part of the lens unit 12 accommodated in the housing part 11 is exposed in the opening 2b. The opening 2b and the lens unit 12 are joined together in a water tight manner. An objective lens 12a is located in the center of the exposed lens unit 12. The camera module 1 takes a picture of an image obtained through this objective lens 12a.

The second case 3 has an inclined part 31 inclined at an angle corresponding to the angle of the open part of the first case 2, and a box-like part 32 protruding rectangularly from the inclined part 31. The inside of this box-like part 32 is hollow, so that it forms, by adjoining the cavity in the first case 2, the housing part 11 of the camera module 1, in a state in which the first case 2 and the second case 3 are joined together. An external connection hole 32a is provided in one side of this box-like part 32, from which a coaxial connector socket 15, as external connection means, protrudes horizontally to the outside of the camera module 1.

An O-ring 16 made of silicon rubber having elasticity is arranged between the inner circumferential surface of the external connection hole 32a and the outer circumferential surface of the coaxial connector socket 15. The O-ring 16 is appropriately compressed and makes tight contact with these two circumferential surfaces to prevent entrance of water droplets into the housing part 11.

The coaxial connector socket 15 is mounted to one of two printed wiring boards 14 held inside the housing part 11 that is located below, a second printed wiring board 14b, by soldering. The distal end of the coaxial connector socket 15 protrudes from an area defined by an extension of one of the side walls 2c of the first case 2. Note that the "area defined by an extension of one of the side walls 2c of the first case 2" refers to the inside of an area defined by an imaginary wall that is an imaginary extension of the side wall 2c, as indicated by two-dot chain lines in FIG. 2.

A wiring cable (not shown) having a matching counterpart coaxial connector plug at the distal end can be connected to the coaxial connector socket 15.

By preparing a wiring cable of a necessary length selected in accordance with the total length or width of the vehicle on which the camera module 1 is to be mounted, the camera module 1 can be mounted flexibly on vehicles of various sizes, or at various positions such as on the back or sides of the same vehicle.

The lens unit 12 has a known structure, i.e., having a plurality of circular lenses including the objective lens 12a (indicated by a broken line in the drawing) which is a convex lens positioned at the top held inside a tubular lens barrel. The plurality of circular lenses are held concentrically along an optical axis A that is a straight line along the vertical direction (up and down direction of the drawing) relative to the center of an imaging surface of the imaging element 13. The structure inside the lens unit 12 such as the number of lenses held there or the distance between the lenses may be set suitably to achieve desired optical characteristics. Since this feature is not directly related to the characteristic features of the present invention, the internal structure of the lens unit 12 is shown in a simplified manner in the drawing.

The imaging element 13 is a known planar CMOS device, mounted and fixed on a first printed wiring board 14a, which is one located on the upper side of the two printed wiring boards 14 held inside the housing part 11. The first printed wiring board 14a and the second printed wiring board 14 are electrically connected to each other with a flexible cable 14c, and configured such that an electrical signal corresponding to image data taken by the imaging element 13 is output from the external connection means mentioned above.

In this embodiment, the first case 2 and the second case 3 are made from a polyamide resin that has favorable weather resistance. Any other synthetic resins may be used as the material of the first case 2 and the second case 3 as long as they satisfy necessary requirements such as strength, weather resistance, or joint strength between the first case 2 and the second case 3 when they are joined together.

The first case 2 and the second case 3 are joined together by abutting a first joint surface 2a located around the open part in the four side walls 2c forming the first case 2, and a second joint surface 31a located around the open part in the inclined part 31 of the second case 3, and joining these joint surfaces together. The circumferential walls of the first case 2 and the second case 3, which form the first joint surface 2a and the second joint surface 31a, have an approximately uniform thickness, so that the width of the joint surfaces is substantially the same all around.

The first joint surface 2a and the second joint surface 31a are joined by ultrasonic welding in a water tight manner. Ultrasonic welding is preferable in carrying out the present invention because a uniform and favorable joint strength is achieved all around the joint surfaces, and the water tightness after the joining is favorable.

As mentioned above, the joint surfaces between the first case 2 and the second case 3 are inclined at about 45° relative to the plane orthogonal to the direction along the optical axis. Because the joint surfaces are inclined, the overall circumferential length of the joint surfaces is longer than that of the joint surfaces that are parallel to the plane orthogonal to the direction along the optical axis as seen conventionally, so that the joint surfaces have a larger area. Since the joint strength per unit area of the joint achieved by ultrasonic welding is approximately uniform, the larger the area of the joint surfaces, the higher the joint strength.

The effect of improving strength according to the present invention can also be achieved by other methods of joining the first case 2 and the second case 3 than ultrasonic welding, such as watertight bonding with the use of an adhesive applied on all around the joint surfaces, as long as the joint strength per unit area achieved by the joining method is approximately uniform.

Figure 4A:
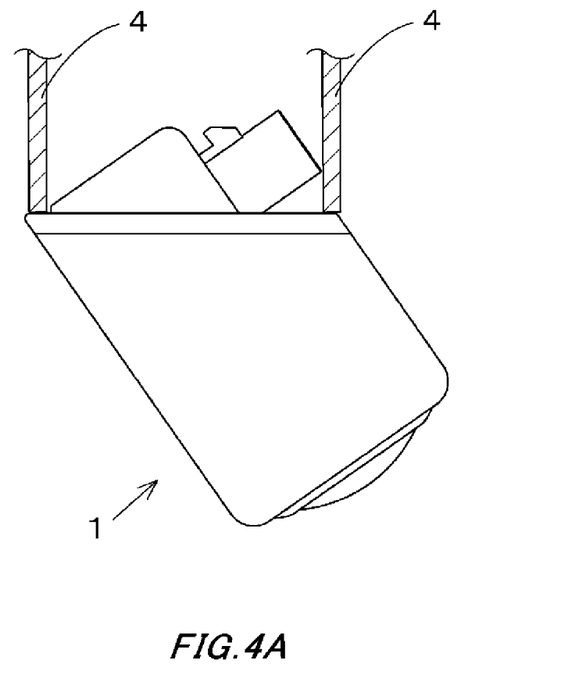
FIG. 4A and FIG. 4B are views showing a process of joining together the first case and the second case of the camera module by ultrasonic welding, FIG. 4A and FIG. 4B showing the camera module according to the present invention and a conventional camera module, respectively.
Figure 4B:
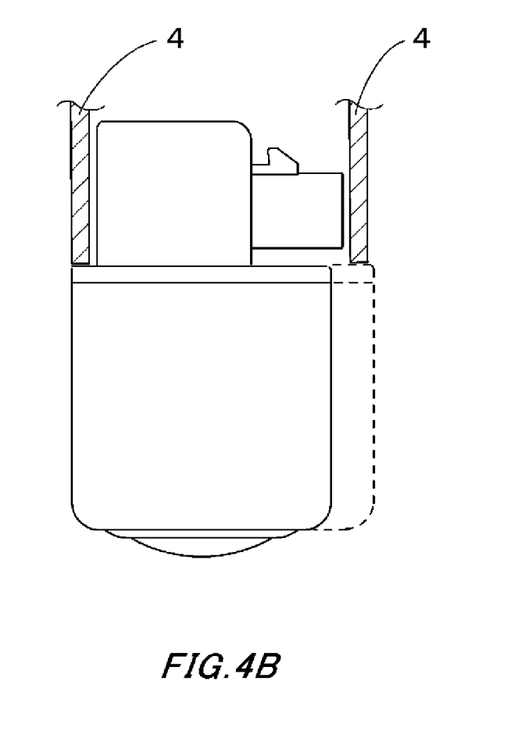

FIG. 4A and FIG. 4B are views showing a process of joining together the first case and the second case of the camera module by ultrasonic welding. FIG. 4A and FIG. 4B respectively show the case with a camera module 1 according to the embodiment of the present invention, and the case with a conventional camera module, for comparative purposes, in which the joint surfaces between the two cases are parallel to the plane orthogonal to the direction along the optical axis.

Commonly, ultrasonic welding is performed via an ultrasonic welding horn 4 while applying ultrasonic waves to parts being joined. In the case with the camera module 1 according to this embodiment, as shown in FIG. 4A, the ultrasonic welding horn 4 is oriented along the vertical direction relative to the inclined part 31 and abutted on the inclined part 31 of the second case 3 for performing ultrasonic welding. The actual ultrasonic welding horn 4 has a frame-like shape corresponding to the second joint surface 31a, but the one shown in FIG. 4 is partly omitted for the convenience of explanation. Here, since the joint surfaces of the camera module 1 are inclined, even though the coaxial connector socket 15 as external connection means is protruding from the area defined by an extension of the side wall of the first case 2, the ultrasonic welding horn 4 can be abutted on the entire part corresponding to the second joint surface 31a without interfering with the coaxial connector socket 15.

In contrast, in the case with the conventional camera module, as shown in FIG. 4B, the coaxial connector socket 15 as external connection means protruding from the area defined by an extension of a side wall of an upper case that is equivalent of the first case constitutes an obstruction, making the ultrasonic welding horn 4 unable to abut on the part corresponding to the joint surface of the case. In order for the ultrasonic welding horn 4 to abut on the part corresponding to the joint surface of the case, the outer shape of the case has to be increased to the extent shown by the broken line in the drawing.

Namely, in a camera module designed to have two cases joined together by ultrasonic welding, even though the external connection means is provided such as to protrude from an area defined by a side wall of the case, interference between an ultrasonic welding horn 4 and external connection means is avoided due to the joint surfaces being inclined, so that the camera module can be made smaller.

INDUSTRIAL APPLICABILITY

The present invention can be suitably used in camera modules in applications that require water tightness, for example for surveillance of the surroundings of a vehicle.

REFERENCE SIGNS LIST

1 camera module
11 housing part
12 lens unit
12a objective lens
13 imaging element
14 printed wiring board
14a first printed wiring board
14b second printed wiring board
14c flexible cable
15 coaxial connector socket (external connection means)
16 O-ring
A optical axis
2 first case
2a first joint surface
2b opening
2c side wall
3 second case
31 inclined part
31a second joint surface
32 box-like part
32a external connection hole
4 ultrasonic welding horn

The invention claimed is:

1. A camera module comprising: a first case and a second case both made from a synthetic resin, the first case and the second case being joined together in a water tight manner to form a housing part, the housing part including a lens unit having an objective lens at a top thereof, an imaging element, and a printed wiring board, which are accommodated therein, the first case having an upper face in which an opening is formed for exposing the objective lens, wherein joint surfaces of the first case and the second case where both are joined together in a direction having a component in an optical axis direction of the lens unit are inclined relative to a plane orthogonal to the optical axis direction of the lens unit.

2. The camera module according to claim 1, wherein the joint surfaces between the first case and the second case are joined together by ultrasonic welding.

3. The camera module according to claim 1, wherein any of the first case and the second case has an opening for external connection, and the camera module further comprises external connection means that is held in a water tight manner relative to a peripheral part of the opening for external connection, the external connection means for connection with an external circuit.

4. The camera module according to claim 2, wherein: the second case has an opening for external connection;

the camera module further comprises external connection means that is held in a water tight manner relative to a peripheral part of the opening for external connection, the external connection means for connection with an external circuit; and the external connection means is protruded from an area defined by an extension of a side wall of the first case.

* * * * *